(12) United States Patent
Ounadjela et al.

(10) Patent No.: US 8,630,148 B2
(45) Date of Patent: Jan. 14, 2014

(54) SYSTEMS, METHODS, AND APPARATUS TO DRIVE REACTIVE LOADS

(75) Inventors: Abderrhamane Ounadjela, Paris (FR); Jacques Jundt, Newton, MA (US); Olivier Moyal, Houston, TX (US); Henri-Pierre Valero, Yokohama (JP); Sandip Bose, Brookline, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 20 days.

(21) Appl. No.: 13/152,189

(22) Filed: Jun. 2, 2011

(65) Prior Publication Data
US 2012/0307596 A1 Dec. 6, 2012

(51) Int. Cl.
*H04B 11/00* (2006.01)
(52) U.S. Cl.
CPC ..................................... *H04B 11/00* (2013.01)
USPC .......................................................... 367/135
(58) Field of Classification Search
USPC .......................................................... 367/135
See application file for complete search history.

(56) References Cited

U.S. PATENT DOCUMENTS

| | | | | |
|---|---|---|---|---|
| 3,562,429 A | * | 2/1971 | West ................................ | 381/96 |
| 4,706,228 A | * | 11/1987 | Owen et al. .................... | 367/147 |
| 5,754,036 A | * | 5/1998 | Walker .......................... | 323/237 |
| 6,308,137 B1 | | 10/2001 | Underhill et al. | |
| 7,327,637 B2 | * | 2/2008 | Chambers et al. ............ | 367/140 |
| RE41,829 E | * | 10/2010 | Hornbostel et al. .......... | 324/323 |
| 7,821,871 B2 | * | 10/2010 | Rohwedder .................... | 367/137 |
| 2003/0161217 A1 | * | 8/2003 | Rohwedder .................... | 367/142 |
| 2006/0152301 A1 | * | 7/2006 | Rohwedder .................... | 333/105 |
| 2006/0236777 A1 | * | 10/2006 | Chambers et al. ............. | 73/801 |
| 2006/0244339 A1 | * | 11/2006 | Mazz et al. .................... | 310/317 |
| 2008/0221801 A1 | * | 9/2008 | Craft et al. ...................... | 702/17 |
| 2009/0133487 A1 | * | 5/2009 | Jeffryes ..................... | 73/152.58 |
| 2009/0245020 A1 | * | 10/2009 | Paffenholz ....................... | 367/21 |

OTHER PUBLICATIONS

Pascal Breton et al., "Well-Positioned Seismic Measurements" Oilfield Review, Spring 2002, pp. 32-45.

* cited by examiner

*Primary Examiner* — Isam Alsomiri
*Assistant Examiner* — James Hulka
(74) *Attorney, Agent, or Firm* — Matthias Abrell (57) ABSTRACT

Systems, methods, and apparatus to drive reactive loads are disclosed. An example apparatus to drive a reactive load includes a reactive component in circuit with the reactive load, a first switching element in circuit with the reactive load to selectively hold the reactive load in a first energy state and to selectively allow the reactive load to change from the first energy state to a second energy state, a second switching element in circuit with the reactive load to selectively hold the reactive load in the second energy state and to selectively allow the reactive load to change from the second energy state to the first energy state, and a controller to detect a current in the reactive load, and to control the first and second switching elements to hold the reactive load in the first or the second energy state when the current traverses a threshold.

12 Claims, 9 Drawing Sheets

SYSTEMS, METHODS, AND APPARATUS TO DRIVE REACTIVE LOADS

FIELD OF THE DISCLOSURE

This disclosure relates generally to acoustic logging and, more particularly, to methods and apparatus to drive reactive acoustic sources.

BACKGROUND

Logging while drilling tools employing various acoustic measurement techniques are routinely suspended in a borehole and used to measure characteristics of the surrounding formation. Shear slowness, which is the inverse of shear wave velocity, is one such formation characteristic of interest. Examples of acoustic measurement techniques include monopole acoustic logging and multipole acoustic logging. Monopole acoustic logging utilizes a monopole acoustic source to generate, among other things, nondispersive shear head waves that can be measured to determine shear slowness. However, monopole acoustic logging yields meaningful shear slowness measurements only in fast formations in which shear slowness is less than mud slowness (also known as the borehole fluid slowness) and, thus, in which nondispersive shear head waves can propagate.

Multipole acoustic logging utilizes multipole acoustic sources, such as dipole or quadrupole acoustic sources, to generate dispersive waves that can be processed to determine shear slowness. Because it does not rely on propagating shear head waves, multipole acoustic logging can be used to measure characteristics of both fast formations and slow formations. However, multipole acoustic logging, such as quadrupole logging in a logging while drilling (LWD) application, can be relatively insensitive to shear slowness variations in fast formations. Thus, under at least some circumstances, multipole acoustic logging can yield relatively less reliable shear slowness measurements in fast formations than in slow formations.

SUMMARY

An example apparatus to drive a reactive load includes a first switching element in circuit with the reactive load to selectively hold the reactive load in a first energy state and to selectively allow the reactive load to change from the first energy state to a second energy state, a second switching element in circuit with the reactive load to selectively hold the reactive load in the second energy state and to selectively allow the reactive load to change from the second energy state to the first energy state, and a controller to detect a current in the reactive load, and to control the first and second switching elements to hold the reactive load in the first or the second energy state when the current traverses a threshold.

An example method disclosed herein includes charging a reactive load, holding the reactive load in a first energy state having a first electrical field polarity, and permitting the reactive load to change from the first energy state to a second energy state having a second electrical field polarity, wherein the change causes the reactive load to propagate a first acoustic wave.

In another example disclosed herein, a system includes a reactive acoustic source to propagate an acoustic wave, an excitation source to provide energy to the reactive load, and a driver circuit to hold the reactive load in a first energy state for a first period, to transition the reactive load from the first energy state to a second energy state to propagate an acoustic wave, and to hold the reactive load in the second energy state for a second period.

DETAILED DESCRIPTION

In the following detailed description, reference is made to the accompanying drawings, which form a part hereof, and within which are shown by way of illustration specific embodiments by which the invention may be practiced. It is to be understood that other embodiments may be utilized and structural changes may be made without departing from the scope of the disclosure.

As used herein, an excitation source or electrical excitation source includes excitation sources that convert generated, commercial, mains and/or grid electrical power to some other form of excitation (e.g., converting commercial power to DC and/or AC, changing a voltage provided by an electrical power generator to a higher or lower voltage, etc.). The terms "excitation sources" or "electrical excitation sources," as used herein, do not include the commercial, mains, or grid electrical power, infrastructure such as power lines, electrical power generation equipment, and/or utilities.

An energy state, as used herein, refers to the state of a circuit when energized, and is characterized and/or differentiated from other energy states by different voltages present at nodes in the circuit, currents present in the circuit, charge densities over one or more components, electrical field densities over one or more components, charge polarities over one or more components, and/or electrical field polarities over one or more components. In some examples disclosed herein, circuits change from a first energy state to a second energy state by changing an electrical charge in one or more components from a first polarity to an opposite polarity.

Example systems, methods, and apparatus disclosed herein may be used to drive reactive loads, such as reactive acoustic sources. In particular, example systems, methods, and apparatus described below are advantageously used to change a reactive acoustic source from a first energy state to a second energy state and to hold the reactive acoustic source in the first energy state or the second energy state for a substantially indefinite time without suffering substantial losses in stored energy. In some examples, a controller is provided to control switching elements to hold a reactive acoustic source in an energy state and to selectively permit the reactive acoustic source to change energy states. In contrast to known methods of driving reactive loads, the example systems, methods, and apparatus disclosed herein are relatively simple and inexpensive to implement, and provide reliable current impulses at high voltages and/or currents to a reactive load.

Furthermore, the example acoustic logging methods and apparatus disclosed herein are not limited to processing acoustic data from any particular type of logging technology. For example, although the example acoustic logging methods and apparatus disclosed herein are described in the context of processing LWD acoustic data, these example methods and apparatus could also be used to process acoustic data obtained via wireline logging or any other type of logging technique, such as measurement while drilling (MWD), logging while tripping (LWT), etc.

Figure 1:
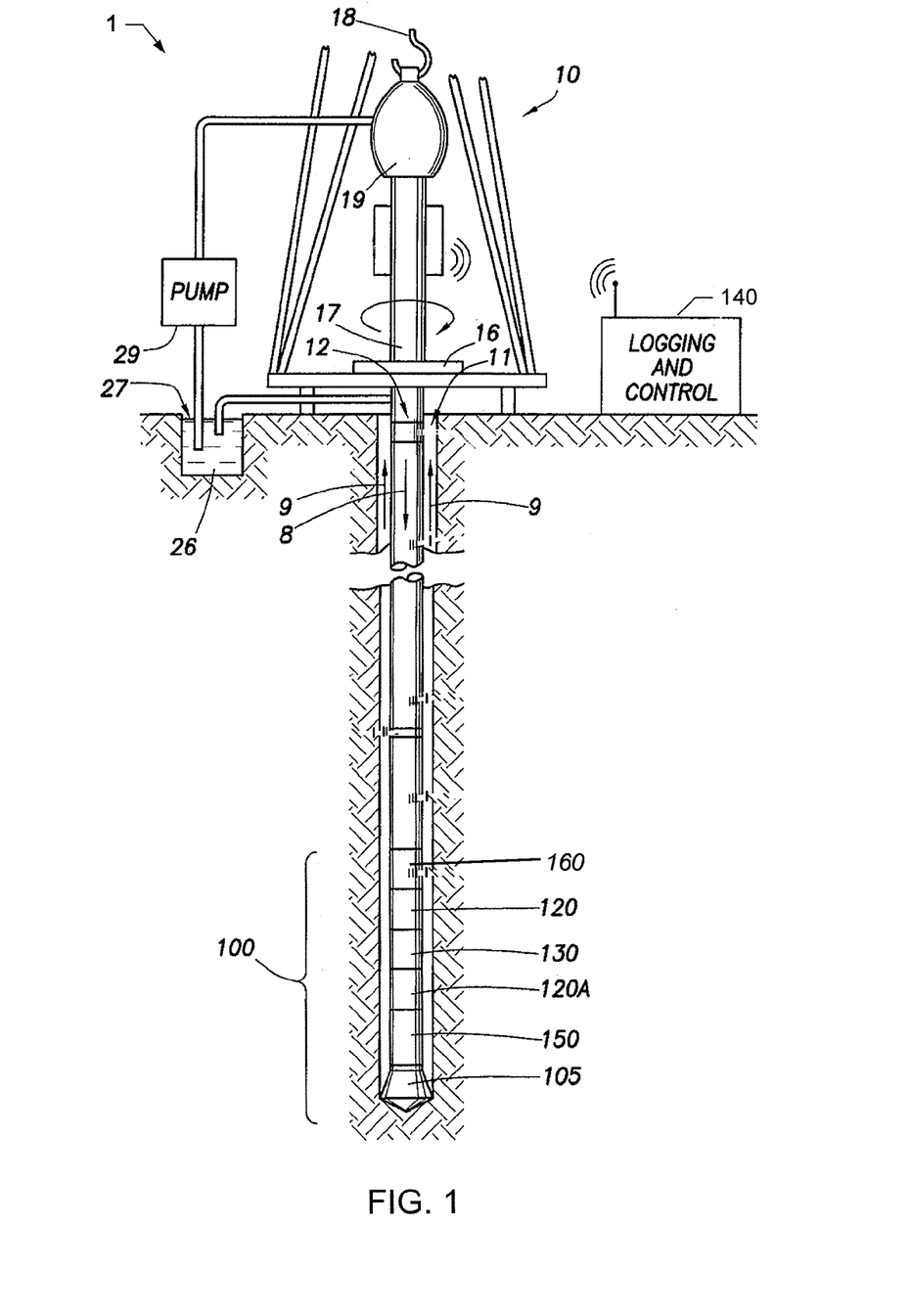
FIG. 1 illustrates a wellsite system in which example systems, methods, and apparatus disclosed herein can be employed.

FIG. 1 illustrates a wellsite system 1 in which the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

A drill string 12 is suspended within the borehole 11 and has a bottom hole assembly 100 which includes a drill bit 105 at its lower end. The wellsite system 1 includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and the rotary swivel 19 which permits rotation of the drill string 12 relative to the hook 18. As is well known, a top drive system could alternatively be used.

In the example of this embodiment, the wellsite system 1 further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid exits the drill string 12 via ports in the drill bit 105, and then circulates upwardly through the annulus region between the outside of the drill string 12 and the wall of the borehole 11, as indicated by the directional arrows 9. In this well-known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor 150, and the drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. References, throughout, to a module at the position of 120 can alternatively mean a module at the position of 120A. The example LWD module 120 includes capabilities for measuring, processing, and storing information, as well as for communicating with surface equipment. In the present embodiment, the LWD module 120 includes a sonic measuring device 160 to receive and/or log acoustic waves from an acoustic source (e.g., sonic transmitting source) in combination with a logging and control system 140.

The MWD module 130 is also housed in a special type of drill collar, as is known in the art, and can contain one or more devices for measuring characteristics of the drill string 12 and the drill bit 105. The MWD tool 130 further includes an apparatus (not shown) for generating electrical power to the downhole system. This apparatus may typically include a mud turbine generator powered by the flow of the drilling fluid, it being understood that other power and/or battery systems may be employed. In the present embodiment, the MWD 130 module includes one or more of the following types of measuring devices: a weight-on-bit measuring device, a torque measuring device, a vibration measuring device, a shock measuring device, a stick slip measuring device, a direction measuring device, and an inclination measuring device.

Figure 2A:
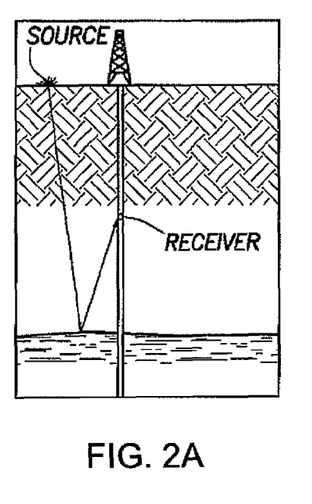
FIGS. 2A-2D illustrate example seismic-while-drilling tools that may be used to implement the wellsite system of FIG. 1.
Figure 2B:
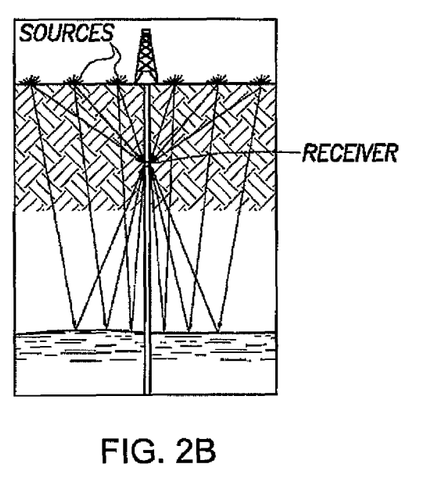
Figure 2C:
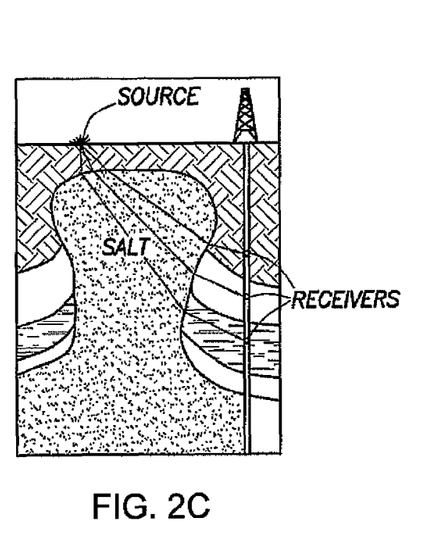
Figure 2D:
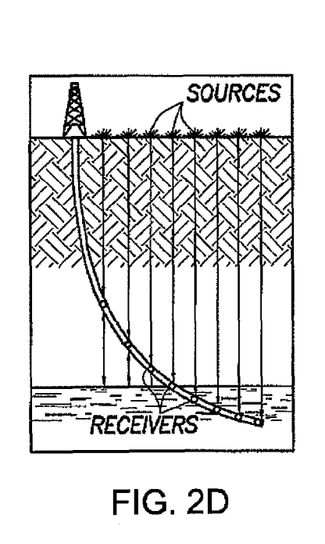

FIGS. 2A-D illustrate example seismic-while-drilling tools that can be used to implement the LWD tool 120, or can be a part of an LWD tool suite 120A of the type disclosed in P. Breton et al., "Well Positioned Seismic Measurements," Oilfield Review, pp. 32-45, Spring, 2002, incorporated herein by reference. The downhole LWD module 120/120A can have a single receiver (as depicted in FIGS. 2A and 2B), or multiple receivers (as depicted in FIGS. 2C and 2D), and can be employed in conjunction with a single seismic source at the surface (as depicted in FIGS. 2A and 2C) to support monopole acoustic logging or plural seismic sources at the surface (as depicted in FIGS. 2B and 2D) to support multipole acoustic logging. Accordingly, FIG. 2A, which includes reflection off a bed boundary, and is called a "zero-offset" vertical seismic profile arrangement, uses a single source and a single receiver; FIG. 2B, which includes reflections off a bed boundary, and is called a "walkaway" vertical seismic profile arrangement, uses multiple sources and a single receiver; FIG. 2C, which includes refraction through salt dome boundaries, and is called a "salt proximity" vertical seismic profile, uses a single source and multiple receivers; and FIG. 2D, which includes some reflections off a bed boundary, and is called a "walk above" vertical seismic profile, uses multiple sources and multiple receivers.

Figure 3:
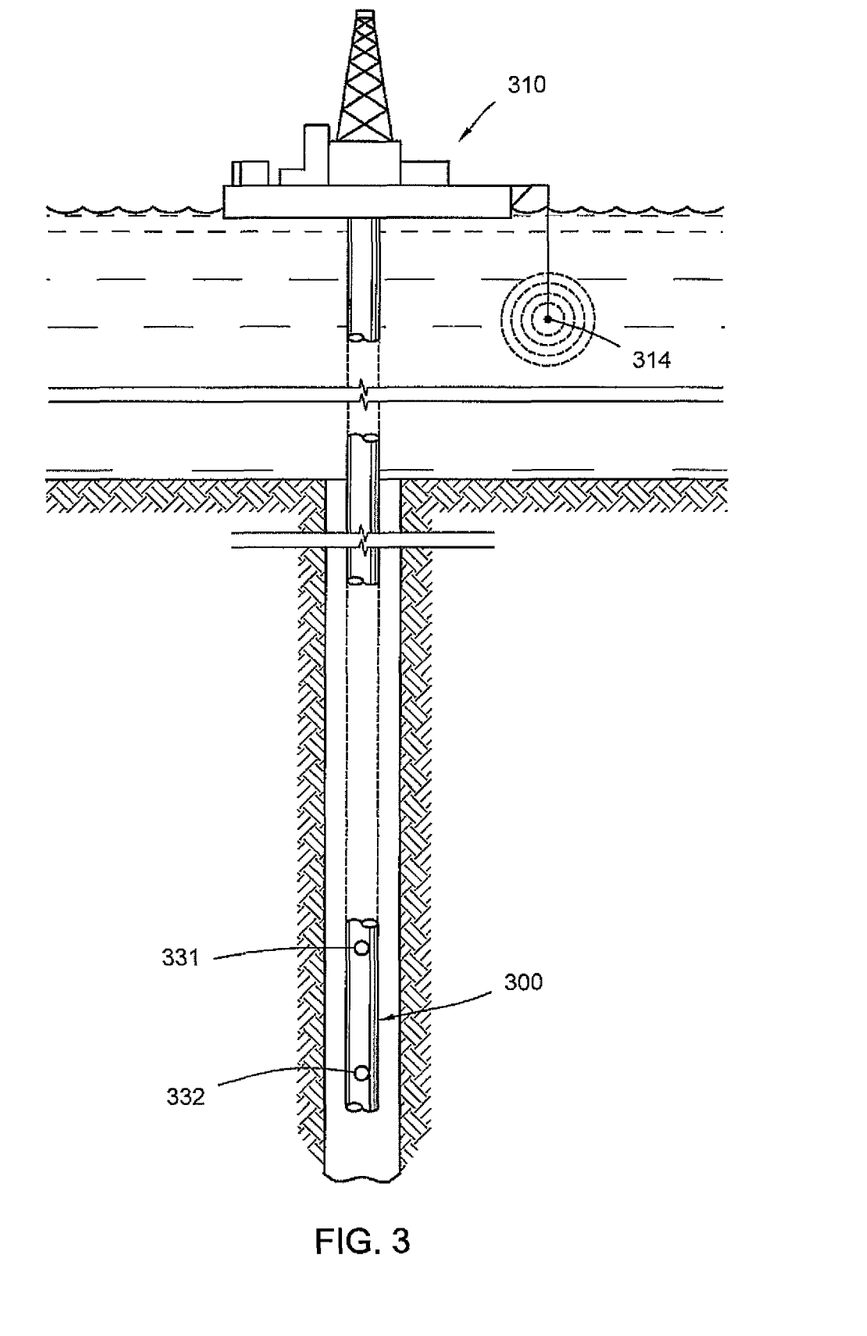
FIG. 3 is a block diagram illustrating an example sonic-while-drilling tool that may be used to implement the wellsite system of FIG. 1.

FIG. 3 illustrates a sonic logging-while-drilling tool that can be used to implement the LWD tool 120, or can be a part of an LWD tool suite 120A of the type described in U.S. Pat. No. 6,308,137, incorporated herein by reference. In the illustrated example of FIG. 3, an offshore rig 310 is employed, and a sonic transmitting source or array 314 is deployed near the surface of the water. Alternatively, any other suitable type of uphole or downhole source or transmitter can be provided. An uphole processor controls the firing of the sonic transmitter 314. Example sonic transmitters 314 disclosed herein include reactive acoustic sources. The uphole equipment can also include acoustic receivers and a recorder for capturing reference signals near the source and/or logging detection times of acoustic signals. The uphole equipment further includes telemetry equipment for receiving MWD signals from the downhole equipment. The telemetry equipment and the recorder are coupled to a processor so that recordings may be synchronized using uphole and downhole clocks. A downhole LWD module 300 includes at least acoustic receivers 331 and 332, which are coupled to a signal processor so that recordings may be made of signals detected by the receivers 331 and 332 in synchronization with the firing of the sonic transmitter 314.

Figure 4:
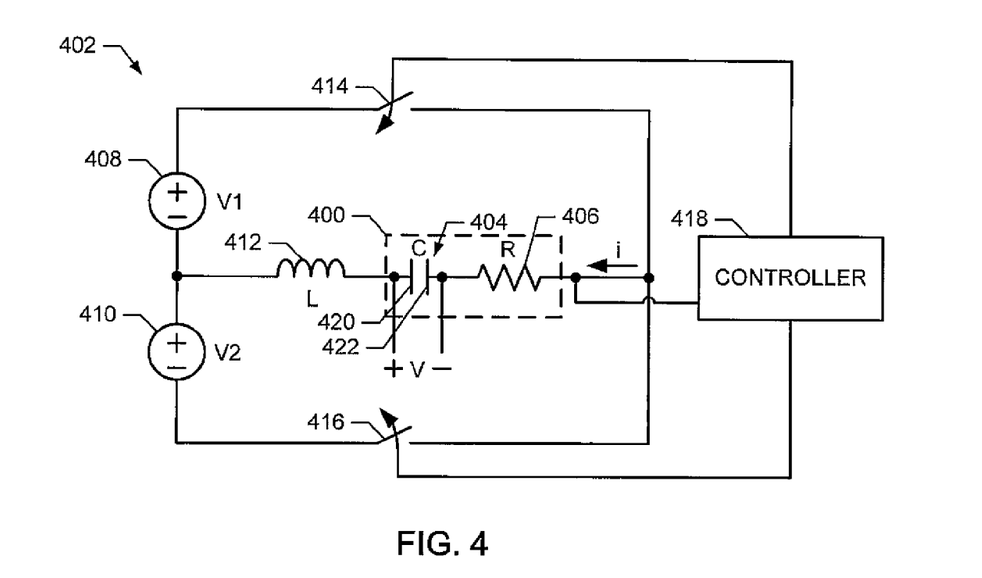
FIG. 4 is a schematic diagram of an example reactive acoustic source and an example driver circuit for the acoustic source.

FIG. 4 is a schematic diagram of an example reactive acoustic source 400 and an example driver circuit 402 for the reactive acoustic source 400. The example reactive acoustic source 400 of FIG. 4 is a piezoelectric transducer and is represented schematically by a capacitor 404 having a capacitance value of C in series with resistor 406 having a resistance value of R. The resistor 406 represents dissipation of electrical energy delivered by the example driver circuit 402 (e.g., in mechanical form as acoustic waves), as well as all loss mechanisms present in the reactive acoustic source 400. The capacitor 404 represents a reactive component of the reactive acoustic source 400. While the examples are described below as having voltages present across the capacitor 404 and/or energy stored by the capacitor 404, these examples are for illustration of the voltages and/or energy stored in the reactive acoustic source 404 (or other type of reactive load) as a whole, and are not intended to be restricted to only energy stored in physical capacitors.

The example driver circuit 402 of FIG. 4 includes excitation sources 408, 410. In some examples, the excitation sources 408, 410 are implemented using DC power supplies having respective voltages V1, V2. In some examples, the voltages V1 and V2 are equal. The driver circuit 402 of the illustrated example further includes a reactive component 412, which is represented by an inductor having an inductance value L. The example reactive component 412 is included to counter the reactance (e.g., capacitance) of the example reactive acoustic source 400 and to establish a resonant frequency for the reactive acoustic source 400 and the driver circuit 402.

The example driver circuit 402 further includes switching elements 414, 416 that are controlled by a controller 418. The example controller 418 selectively opens (e.g., electrically disconnects) and closes (e.g., electrically connects) the switching elements 414, 416 to control an energy state of the reactive acoustic source 400 and/or to transition the reactive acoustic source 400 from one energy state to another (e.g., to generate and/or propagate an acoustic wave). Each example change in energy state changes the polarity of a charge present on the capacitor 404. When starting up the example driver circuit 402 and the reactive acoustic source 400 (e.g., energizing the driver circuit 402 and the reactive acoustic source 400 from a zero-energy state to a steady-state energy state), the controller 418 selectively opens and closes the switching elements 414, 416 to cycle the reactive acoustic source 400 through several energy states to build up energy in the reactive acoustic source 400. The startup cycle of the example driver circuit 402 and the example reactive acoustic source 400 is described in more detail below.

When the reactive acoustic source 400 has accumulated sufficient energy, the example controller 418 enters a steady-state mode of operation, in which the driver circuit 402 selectively alternates the reactive acoustic source 400 between two energy states. In a first example energy state of the reactive acoustic source 400 and the driver circuit 402, the example switching elements 414, 416 are both open, and the example capacitor 404 holds a first charge such that a first electrode 420 of the capacitor 404 is positive (i.e., has a higher potential) with respect to a second electrode 422 of the capacitor 404. When the example controller 418 closes the switch 414, a current circulates through the closed loop that includes the excitation source 408. The current is initially zero due to the inductor L opposing instantaneous changes in current. The current increases over time, reaches an upper current, and decreases to zero as the capacitor 404 is charged with a second charge having an opposite polarity of the first charge (e.g., the first electrode 420 of the capacitor 404 is negative (i.e., has a lower potential) with respect to the second electrode 422 of the capacitor 404). Simultaneously, the voltage across capacitor 404 first decreases, reaches zero when the current is at its upper limit, and then increases with the opposite polarity. The change in energy state caused by the controller 418 and the switching element 414 causes the example reactive acoustic source 400 to generate an acoustic wave, modeled by current flowing through the resistor 406 during the transition between energy states.

The example controller 418 then opens the switching element 414 when the current (illustrated in FIGS. 4-6 as a current i having a reference direction) reaches zero. At that time, both switching elements 414, 416 are open, and the driver circuit 402 can hold the energy state of the reactive acoustic source 400 substantially indefinitely. When the switching elements 414, 416 are held open, energy is stored in the form of an electric field in the capacitor 404. To change the energy state of the reactive acoustic source 404 from the second energy state back to the first energy state, the example controller 418 closes the switching element 416 to allow a current to flow through the closed loop that includes the example excitation source 410. As with the change from the first energy state, the current increases to an upper limit, and then decreases to zero as the capacitor 404 is again charged with substantially the first charge (e.g., the first electrode 420 of the capacitor 404 is positive with respect to the second electrode 422 of the capacitor 404). The example controller 418 then opens the switching element 416 when the current reaches zero.

Whenever one of the switching elements 414, 416 is closed, the driver circuit 402 and the reactive acoustic source 400 oscillate at the natural resonant frequency $f_0$, defined as $f_0=1/(2\pi\sqrt{LC})$. The current i in the circuit changes according to $i=\sin(2\pi f_0 t)$, while the voltage V across capacitor 404 changes based on $V=\cos(2\pi f_0 t)$. Accordingly, the example driver circuit 402 may be used to toggle energy states of a capacitive load (e.g., the reactive acoustic source 400, the capacitor 404), at arbitrary moments in time, in such a way that voltage changes during transitions between energy states resemble the shapes of half-periods of a sinusoid. Neglecting the voltage drops across the switching elements 414, 416, the upper voltage $V_{Cpeak}$ across the example capacitor 404 of FIG. 4 is $V_{Cpeak}=Q_0 V1=Q_0 V2$, where $Q_0$ is the quality factor at the resonant frequency, $$Q_0 = \frac{1}{R}\sqrt{\frac{L}{C}}.$$

Once the steady-state energy state is reached, the example driver circuit 402 of FIG. 4 provides an amplification of the supply voltage by a factor $Q_0$. The example driver circuit 402 therefore advantageously permits use of relatively simple excitation sources 408, 410. The example switching elements 414, 416 of FIG. 4 are selected to provide high isolation (e.g., electrical insulation) in the open (e.g., off) state and a low resistance in the closed (e.g., on) state. Because the example driver circuit 402 advantageously uses low-loss switching elements 414, 416 and reactive elements (e.g., the reactive component 412), little energy is wasted due to mechanical or electrical dissipation and the overall power efficiency of the example driver circuit 402 is very close to unity.

When starting up the example driver circuit 402 and the reactive acoustic source 400, the example reactive acoustic source 400 is initially in a zero-energy state (e.g., substantially zero energy is stored in the capacitor 404), the example excitation sources 408, 410 are not energized, and the example switching elements 414, 416 are in open states. The example controller 418 (or, alternatively, some person and/or other control mechanism) begins by energizing the excitation sources 408, 410 to provide V1 and V2, respectively. The example controller 418 of FIG. 4 then closes one of the switching elements 414, 416 (in this example, the switching element 416) to charge the capacitor 404. In this example, the capacitor 404 is charged to the voltage V2, where the electrode 420 has a positive charge with respect to the electrode 422.

When the current i is zero (e.g., the capacitor 404 has finished charging to V2), the example controller 418 opens the switching element 416 and closes the switching element 414. As a result, the capacitor 404 is charged to a peak voltage V1+V2 (which, in this example, is equal to 2*V2=2*V1), where the electrode 422 has a positive voltage with respect to the electrode 420. When the current i again reaches zero, the controller 418 opens the switching element 414 and again closes the switching element 416 to charge the capacitor 404 to a peak voltage of V2+V1+V2 (in this example, 3*V1=3*V2). The example controller 418 repeats the process of alternately charging the capacitor 404 until the capacitor 404 reaches a steady-state peak voltage of $(Q_0*V1/2)+(Q_0*V2/2)$, or $Q_0*V1=Q_0*V2$.

The example controller 418 is coupled to the example reactive acoustic source 400 to determine when the current i is zero or below a threshold. In some other examples, the controller 418 is configured to control the switching elements 414, 416 to close and/or open based on an input signal timing.

Figure 5:
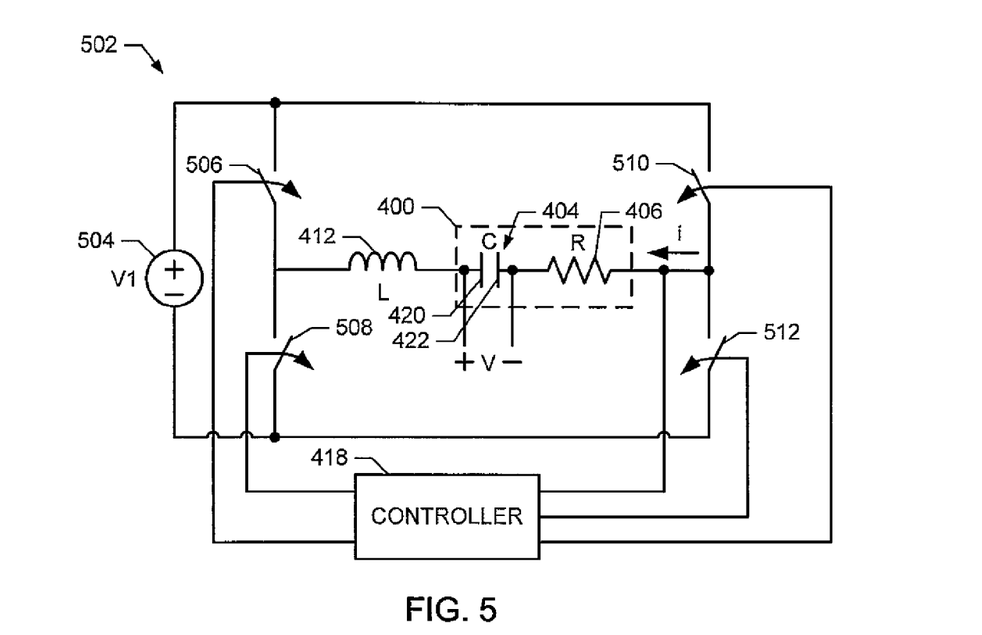
FIG. 5 is a schematic diagram of the example reactive acoustic source of FIG. 4 and another example driver circuit for the reactive acoustic source.

FIG. 5 is a schematic diagram of the example reactive acoustic source 400 of FIG. 4 and another example driver circuit 502 to drive the acoustic source 400. The example reactive acoustic source 400 of FIG. 4 is represented in FIG. 5 by the capacitor 404 having the electrodes 420 and 422 in series with the resistor 406. Like the driver circuit 402 illustrated in FIG. 4, the example driver circuit 502 of FIG. 5 includes the reactive component 412 and the controller 418. However, unlike the driver circuit 402 of FIG. 4, the example driver circuit 502 includes a single excitation source 504 and four switching elements 506, 508, 510, 512. The example excitation source 504 generates a voltage V1.

The example switching elements 506, 508, 510, 512 of FIG. 5 are arranged in a structure known as an H bridge. The controller 418 causes the example switching elements 506 and 512 to open and/or close substantially simultaneously, and separately causes the example switching elements 508 and 510 to open and/or close substantially simultaneously. As in the example driver circuit 402 of FIG. 4, upon startup of the reactive acoustic source 400, the example controller 418 repeatedly changes the energy state of the reactive acoustic source 400 to build up energy. In the example of FIG. 5, the controller 418 alternates closing and opening the switching elements 506 and 512 with closing and opening the switching elements 508 and 510 to build up the energy in the reactive acoustic source 400. After a number of energy state change cycles, the example reactive acoustic source 400 reaches a first steady-state energy state.

In the example first steady-state energy state of the circuit, all four switching elements 506-512 are open and a charge is present in the example capacitor 404. The example controller 418 closes the switching elements 508 and 510 to create a closed circuit and to permit the example reactive acoustic source 400 to change from the first energy state to a second energy state. When the switching elements 508 and 510 are closed, the voltage V across the example capacitor 404 decreases from an upper voltage at a first polarity to a voltage having an opposite polarity according to $V=\cos(2\pi f_0 t)$. Additionally, the current i increases to an upper current and then decreases to zero according to $i=\sin(2\pi f_0 t)$. When the current reaches zero, the example controller 418 opens the switching elements 508 and 510 to hold the example reactive acoustic source 400 in the second energy state. The example driver circuit 502 causes the reactive acoustic source 400 to change from the first energy state to the second energy state in approximately one half-period $T_0/2$ of natural oscillation of the resonant circuit R, L, C, or $T_0/2=\pi\sqrt{LC}$. The change of energy state by the reactive acoustic source 400 results in the generation of an acoustic wave.

The controller 418 of the illustrated example maintains the switching elements 506-512 in an open position for an arbitrary period of time, during which energy is stored in the capacitor 404. The controller 418 then closes the example switches 506 and 512 to cause the reactive acoustic source 400 to change from the second energy state to the first energy state. As described above, the current i increases to an upper current and then decreases to zero while the voltage V on the capacitor 404 decreases and then increases with an opposite polarity. The change from the second energy state to the first energy state also causes the example reactive acoustic source 400 to generate an acoustic wave.

Figure 6:
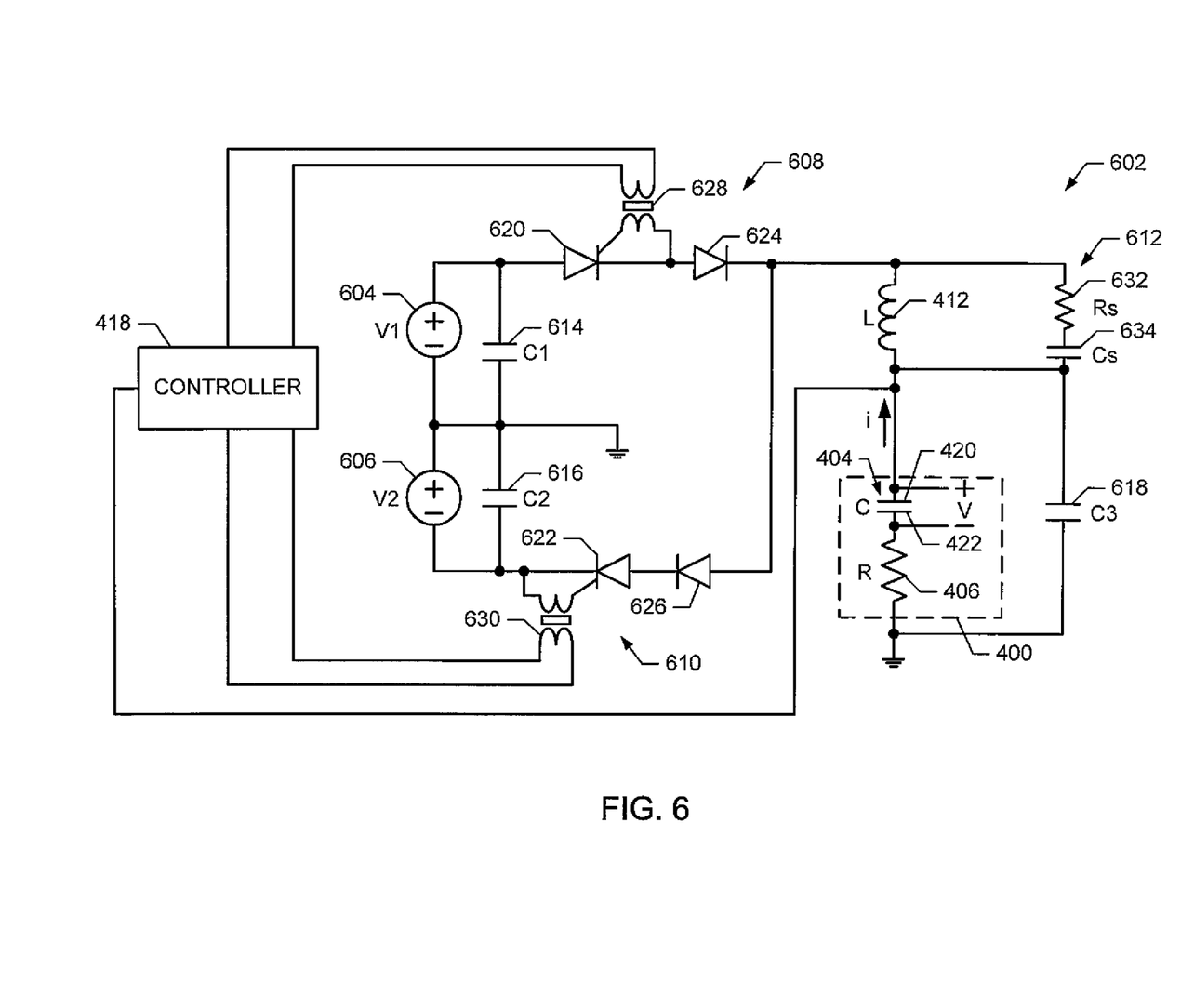
FIG. 6 is a schematic diagram of the example reactive acoustic source of FIG. 4 and yet another example driver circuit for the acoustic source.

FIG. 6 is a schematic diagram of the example reactive acoustic source 400 of FIG. 4 and yet another example driver circuit 602 for the reactive acoustic source 400. Like the example driver circuits 402, 502 of FIGS. 4 and 5, the example driver circuit 602 includes the reactive component 412 and the controller 418. The example driver circuit 602 of FIG. 6 further includes excitation sources 604, 606, switching elements 608, 610, a snubber circuit 612, stiffening capacitors 614, 616 and a shunt capacitor 618 in parallel with the example reactive acoustic source 400.

The example stiffening capacitors 614, 616 are connected in parallel with the respective excitation sources 604, 606 to lower the internal impedance of the excitation sources 604, 606 and/or, in combination with the excitation sources 604, 606, to source large peak currents that may be experienced during transitions between energy states. The example shunt capacitor 618 is connected in parallel with the example reactive acoustic source 400 to increase the quality factor $Q_0$ of the driver circuit 602 (e.g., to provide higher peak voltages to the reactive acoustic source 400 for a given excitation source voltage V1, V2) and/or to absorb charge accumulated by the reactive acoustic source 400 in response to mechanical bounce and/or other effects.

The example switching elements 608, 610 each include a thyristor 620, 622, a blocking diode 624, 626, and a pulse transformer 628, 630. The example thyristors 620, 622 are advantageously used to implement the example switching elements 608, 610 because thyristors are available with large voltage and current ratings, are relatively rugged, and may be used in combination with relatively simple circuit components for control. In particular, thyristors may be turned on (e.g., closed) by applying current impulses to a gate terminal. Conversely, thyristors turn off substantially spontaneously when exposed to a reverse voltage. In the example of FIG. 6, the controller 418 provides current impulse(s) to the example thyristors 620, 622 via respective ones of the pulse transformers 628, 630. However, thyristors can exhibit relatively long reverse recovery times. To reduce or prevent reverse currents from flowing through the thyristors 620, 622, which could potentially cause undesirable discharge of the capacitor 404 and/or potentially damaging voltage spikes in the reactive component 412, the example switching elements 608, 610 of FIG. 6 also include the respective blocking diodes 624, 626. The example blocking diodes 624, 626 have relatively fast reverse recovery times and can reduce or prevent problem(s) associated with allowing reverse currents to flow through the switching elements 608, 610.

The example snubber circuit 612 includes a resistor 632 having a resistance value Rs and a capacitor 634 having a capacitance value Cs. Any residual energy remaining in the inductor 412 when the switching elements 608, 610 are turned off is absorbed by the example snubber circuit 612 to reduce or avoid voltage spikes appearing across the inductor 412, which may apply excessive voltage stress on switching elements 608, 610 and/or the diodes 624, 626. In the illustrated example, the resistance value Rs is selected to critically damp the self resonance of the inductor 412 according to $R_s=0.5\sqrt{L/C_{stray}}$, where $C_{stray}$ is the stray wiring capacitance present across the terminals of the inductor 412. Additionally, the example capacitance value $C_s$ is selected to minimize the energy dissipated in the resistor 632 during transitions between energy states based on the corner frequency $f_c=1/(2\pi\pi R_s C_s)$. In some examples, the corner frequency $f_c$ of the snubber circuit 612 is preferably chosen to be high compared to $f_0$ and low compared to the self-resonant frequency $f_r$ of inductor 412 according to $f_r=1/(2\pi\sqrt{LC_{stray}})$.

In operation, the example controller 418 controls the switching elements 608, 610 (e.g., by providing voltages to the respective pulse transformers 628, 630) to alternate switching the example reactive acoustic source 400 between energy states to build up the voltage V applied to the capacitor 404. After a number of energy state changes, the example driver circuit 602 reaches a steady-state mode of operation. For example, the steady-state mode of operation may occur when the voltage V is equal or substantially equal to V1*$Q_0$ and/or V2*$Q_0$.

In a first example energy state, the first electrode 420 of the capacitor 404 has a positive voltage with respective to the second electrode 422. Additionally, the controller 418 holds the switching elements 608, 610 open. At some time, the example controller 418 causes the driver circuit 602 to close the switching element 610 by applying a voltage to the pulse transformer 630 while keeping the switching element 608 open. As with the example driver circuits 402, 502 of FIGS. 4 and 5, the current i through the example reactive acoustic source 400 of FIG. 6 increases to an upper current and then decreases as the voltage V on the capacitor 404 decreases and then increases with a polarity opposite to the polarity in the first energy state. When the current i decreases substantially to zero, the example controller 418 causes the switching element 610 to open. As mentioned above, the blocking diode 626 reduces or prevents reverse currents from discharging the capacitor 404 as the thyristor 622 turns off.

To switch the example reactive acoustic source 400 from the second energy state to the first energy state, the controller 418 of FIG. 6 closes the switching element 608 by applying a voltage to the pulse transformer 628 while maintaining the switching element 610 in an open state. When the switching element 608 is closed, the current i increases and then decreases to zero while the voltage V decreases and then increases having an opposite polarity from the second energy state (e.g., the same polarity as in the first energy state) as described above. When the current i decreases to zero or substantially zero, the thyristor 620 turns off to reduce or prevent reverse currents from discharging the capacitor 404. The blocking diode 624 reduces or prevents reverse currents from discharging the capacitor 404 as the thyristor 620 turns off, because the example thyristor 620 turns off relatively slowly. The example controller 418 can hold the reactive acoustic source 400 in the first and/or second energy states substantially indefinitely by maintaining the switching elements 608, 610 as open switches. When the controller 418 causes the driver circuit 602 to change the energy state of the reactive acoustic source 400, the reactive acoustic source 400 generates an acoustic wave.

While example switching elements are described in FIGS. 4, 5, and 6, other types of switching elements may additionally or alternatively be used. For example, any of the switching elements 414, 416, 506, 508, 510, 512, 608, or 610 may be replaced with any other type of electrical switching element including, but not limited to, bipolar junction transistors (BJTs), metal-oxide-semiconductor field effect transistors (MOSFETs), insulated gate bipolar transistors (IGBTs), and/or electrical relays, any associated circuitry.

Additionally, while the example driver circuits disclosed herein are described with reference to reactive acoustic sources such as piezoelectric transducers, the example driver circuits may be used and/or modified to be used to drive other types of magnetostrictive transducers, as well as magnetically-actuated valves, magnetically-actuated relays, and/or any other type of primarily reactive load which can be driven with sinusoidally-shaped current pulses and/or impulses.

While the example controller 418 of FIGS. 4-6 is described as opening selected ones of the switching elements 414, 416, 506, 508, 510, 512, 608, 610 when a current through the reactive acoustic source is zero or substantially zero, the example controller may additionally or alternatively open the selected ones of the switching elements 414, 416, 506, 508, 510, 512, 608, 610 when the current decreases below a threshold current. For example, the thyristors 620, 622 of FIG. 6 may be selected to have a holding current threshold below which the thyristor 620, 622 stops conducting current and changes to a blocking mode.

Figure 7:
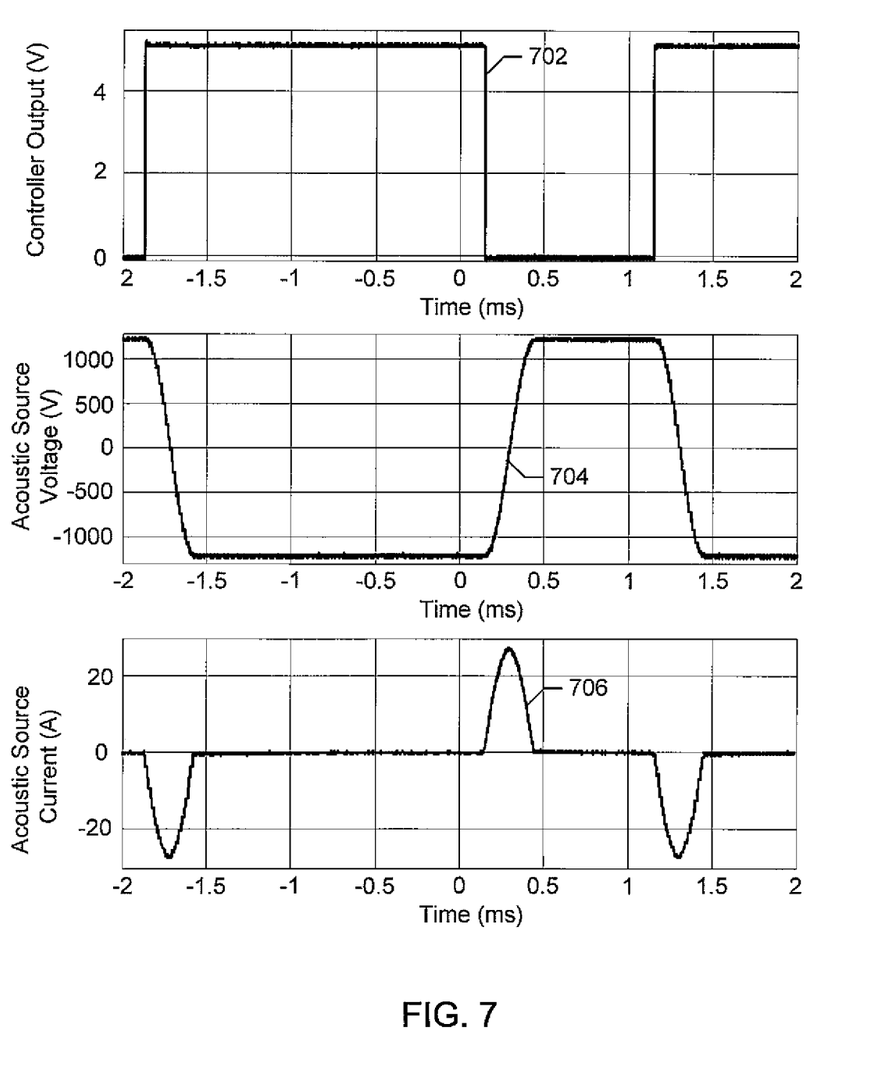
FIG. 7 is a graph depicting voltage and current waveforms obtained by testing the example reactive acoustic source and the example driver circuit illustrated in FIG. 6.

FIG. 7 is a graph 700 depicting voltage and current waveforms obtained by testing the example reactive acoustic source 400 and the example driver circuit 602 illustrated in FIG. 6. The example waveform 702 is an input M-sequence voltage, the example waveform 704 is a voltage across the reactive acoustic source 400 (e.g., the voltage applied to the reactive acoustic source 400 by the driver circuit 602), and the example waveform 706 is a charge current flowing through the example reactive acoustic source 400. The example waveforms 702-706 were applied to a piezoelectric transducer having a capacitance (e.g., a capacitance value C of the capacitor 404) of 1 microfarad (µF), in series with a resistance (e.g., a resistance value R of the resistor 406) of approximately 1 ohm. The example reactive component 412 is an 8.5 millihenry (mH) inductor, which results in a resonant frequency $f_0$ of 1,726 hertz (Hz) for the driver circuit 602 and the reactive acoustic source 400. As a result, the duration of each transition from one energy state to another, corresponding to half a sine-wave cycle at the resonant frequency, is about 290 microseconds (µs).

As illustrated in FIG. 7, the waveform 702 shows an output voltage from the controller 418 to control, for example, the pulse transformer(s) 628, 630 to cause the transitions between energy states (and, thus, acoustic waves). The clock frequency associated with the example waveform 702 is about 1,000 Hz. The example waveform 704 is the voltage across the reactive acoustic source 400 of FIG. 6. As illustrated in FIG. 7, a peak-to-peak voltage swing of 2,400 V occurs with an example voltage V1=V2=19 V provided by the example excitation sources 604, 606 (e.g., a quality factor $Q_0$ of about 2400 V/38 V≈63.16. As illustrated in FIG. 7, the peak current when switching between the first and second energy states is about 28 Amperes (A).

Figure 8A:
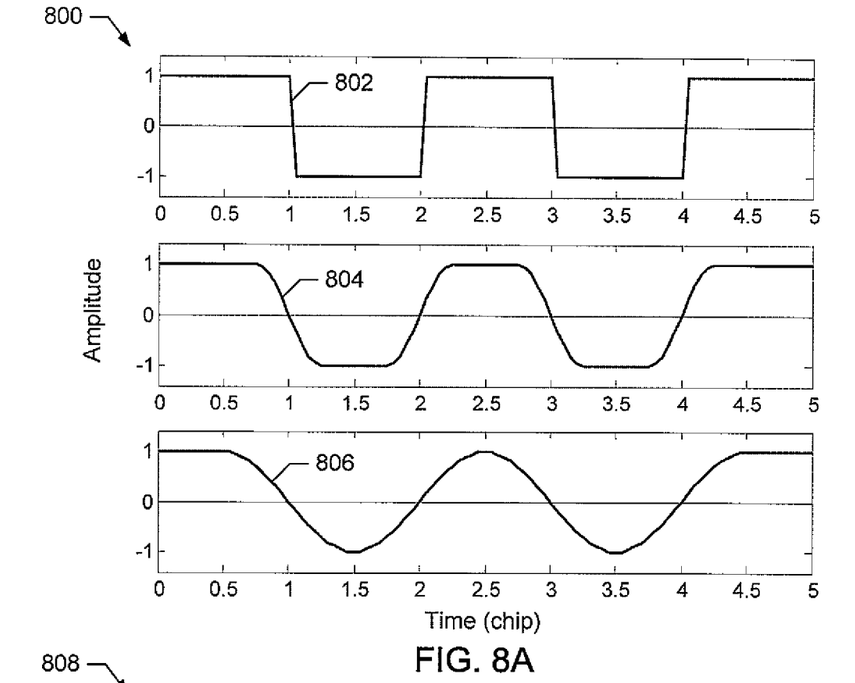
FIG. 8A is a graph depicting current waveforms representing example M-sequence signals having different transitions that may be applied to the example reactive acoustic source of FIGS. 4-6 to generate acoustic waves.
Figure 8B:
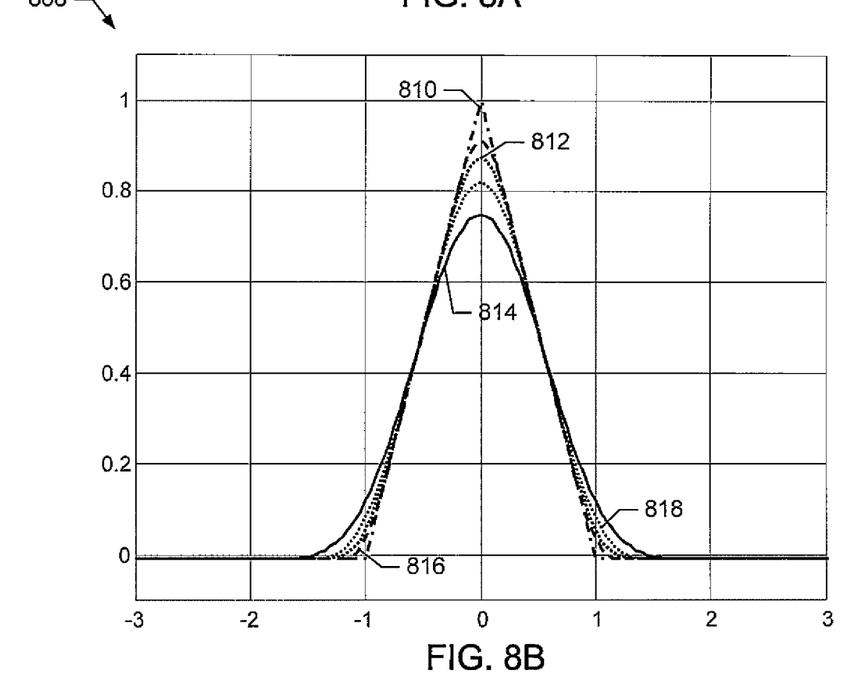
FIG. 8B is a graph depicting autocorrelation functions and cross-correlation functions for the example current waveforms of FIG. 8A.

FIG. 8A is a graph 800 depicting current waveforms 802, 804, 806 representing example M-sequence signals having different transitions that may be applied to the example reactive acoustic source of FIGS. 4-6 to generate acoustic waves. FIG. 8B is a graph 808 depicting autocorrelation functions 810, 812, 814 and cross-correlation functions 816, 818 for the example current waveforms 802, 804, 806 of FIG. 8A. Specifically, the example M-sequence signal waveform 802 is a portion of an ideal M-sequence in the sense that the waveform 802 experiences steep transitions. The example M-sequence signal waveform 804 is the same portion of the M-sequence as the waveform 802, but the transitions of the waveform 804 are half-periods of a sine-wave. The example M-sequence signal waveform 806 is also the same portion of the M-sequence as the waveforms 802, 804, but the transitions of the waveform 806 extend to the whole clock period.

The waveform 810 represents the autocorrelation function of the waveform 802, the waveform 812 represents the autocorrelation function of the waveform 804, and the waveform 814 represents the autocorrelation function of the waveform 806. The waveform 816 represents the cross-correlation function between the waveform 802 and the waveform 804. The waveform 818 represents the cross-correlation function between the waveform 802 and the waveform 806. As demonstrated from FIGS. 8A and 8B, the smooth transition currents generated in the example driver circuits 402, 502, 602 of FIGS. 4, 5, and 6 do not appreciably degrade the compactness of the correlation functions and do not give rise to spurious side lobes. Further, the results illustrated in FIGS. 8A and 8B are not limited to the example 127-state sequence used to generate the graphs 802, 808, but instead apply to multiple M-sequences substantially without regard to the length of the M-sequences.

While example manners of implementing the sonic transmitter 314 of FIG. 3 has been illustrated in FIGS. 4, 5, and 6, one or more of the elements, processes and/or devices illustrated in FIGS. 4, 5, and 6 may be combined, divided, re-arranged, omitted, eliminated and/or implemented in any other way. Further, the example controller 418, the example switching elements 414, 416, 506, 508, 510, 512, 608, 610 and/or, more generally, the example driver circuits 402, 502, 602 of FIGS. 4, 5, and 6 may be implemented by hardware, software, firmware and/or any combination of hardware, software and/or firmware. Thus, for example, the example controller 418, the example switching elements 414, 416, 506, 508, 510, 512, 608, 610 and/or, more generally, the example driver circuits 402, 502, 602 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example controller 418 and/or the example switching elements 414, 416, 506, 508, 510, 512, 608, 610 are hereby expressly defined to include a computer readable medium such as a memory, DVD, CD, etc. storing the software and/or firmware. Further still, the example driver circuits 402, 502, 602 of FIGS. 4, 5, and 6 may include one or more elements, processes and/or devices in addition to, or instead of, those illustrated in FIGS. 4, 5, and 6, and/or may include more than one of any or all of the illustrated elements, processes and devices.

Figure 9:
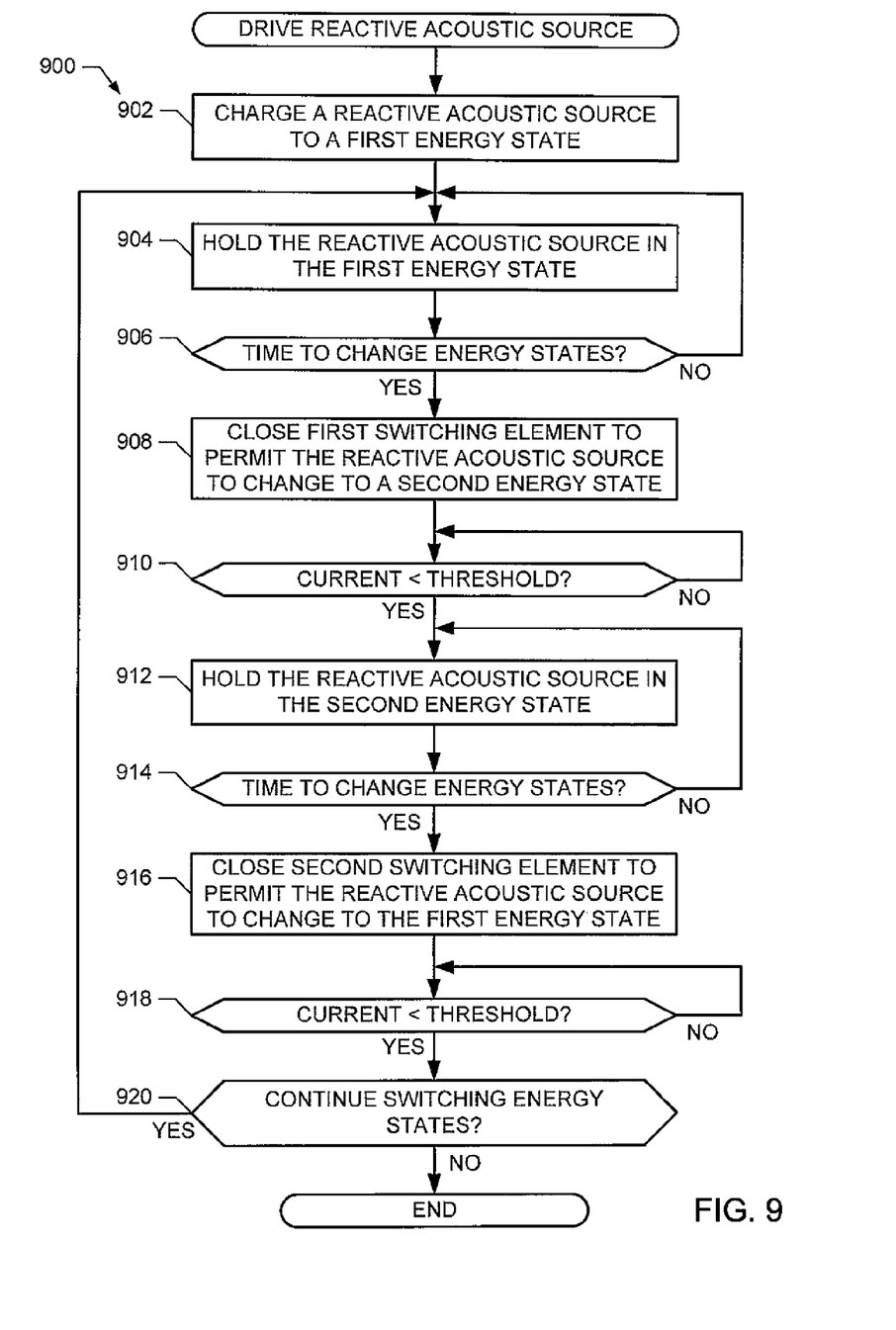
FIG. 9 is a flowchart representative of an example process that may be performed to implement the controller of FIGS. 4-6.

A flowchart representative of an example process for implementing the controller 418 of FIGS. 4, 5, and 6 is shown in FIG. 9. In this example, the process may be implemented by a program for execution by a processor such as the processor 1012 shown in the example computer 1000 discussed below in connection with FIG. 10. The program may be embodied in software stored on a computer readable medium such as a CD-ROM, a floppy disk, a hard drive, a digital versatile disk (DVD), or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 9, many other methods of implementing the example controller 418 may alternatively be used. For example, the order of execution of the blocks may be changed, and/or some of the blocks described may be changed, eliminated, or combined.

As mentioned above, the example process of FIG. 9 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example operations of FIG. 9 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

FIG. 9 is a flowchart representative of an example process 900 that may be performed to implement the controller 418 of FIGS. 4-6. As mentioned above, the example process 900 may be implemented using coded instructions stored on a tangible computer readable medium. While the example process 900 is discussed with reference to the example driver circuit 602 and the example reactive acoustic source 400 of FIG. 6, the example process 900 is also applicable to the example driver circuits 402, 502 of FIGS. 4 and 5, to other types of driver circuits, and/or to other types of reactive loads. The example process 900 of FIG. 9 begins with the controller 418 controlling the driver circuit 602 (e.g., via the switching elements 608, 610 of FIG. 6) to charge the reactive acoustic source 400 to a first energy state (block 902). In some examples, the first energy state is a first steady-state energy state, a voltage at the capacitor terminals based on voltages V1, V2 provided by the excitation sources 604, 606 of FIG. 6 and the quality factor $Q_0$ of the driver circuit 602. The charging may be performed by, for example, alternating closing one of the switching elements 608 while opening the other of the switching elements 610 with closing the other of the switching elements 610 while opening the first one of the switching elements 608.

When the reactive acoustic source 400 is charged to the first energy state (block 902), the example controller 418 holds the reactive acoustic source 400 in the first energy state (block 904). For example, the respective thyristors 620, 622 turn off when the current through the thyristors 620, 622 reaches zero or substantially zero (e.g., when the reactive acoustic source 400 reaches the first energy state), which causes the switching elements 608, 610 to be in an open switch state. In some examples, the controller 418 controls the switching elements 608, 610 to open when the current through the reactive acoustic source 400 is zero or substantially zero, which reduces losses caused by dissipation of electrical energy. At some time, the example controller 418 determines whether it is time for the reactive acoustic source 400 to change energy states (block 906). Changing energy states may occur when, for example, the reactive acoustic source 400 is to generate an acoustic wave for measurement and/or logging. The example controller 418 may determine times to change energy states based on, for example, discrete desired times for generating acoustic waves and/or at times consistent with a control signal such as an M-sequence, a pulse-modulated signal, and/or any other type of periodic or aperiodic signal. If the controller 418 determines that it is not time to change energy states (block 906), control returns to block 904 to continue holding the reactive acoustic source 400 in the first energy state.

When the example controller 418 determines that it is time to change energy states (block 906), the controller 418 closes a first switching element (e.g., the switching element 610 of FIG. 6) to permit the reactive acoustic source to change to a second energy state (block 908). For example, the controller 418 may apply a voltage to the pulse transformer 630 to cause the thyristor 622 to conduct current in a circuit including the reactive acoustic source 400 and the example excitation source 606. While the reactive acoustic source 400 changes to the second energy state, the example controller 418 monitors a current flowing through the reactive acoustic source 400 to determine whether the current is less than a threshold (block 910). For example, the current may be less than the threshold when the current is zero or substantially zero.

When the controller 418 detects that the current is less than the threshold (block 910), the controller 418 holds the reactive acoustic source 400 in the second energy state (block 912). In the example second energy state, the reactive acoustic source 400 stores an electric field having substantially the same energy but an opposite polarity as an electric field stored by the reactive acoustic source 400 in the first energy state. The controller 418 may hold the reactive acoustic source 400 in the second energy state by, for example, controlling the switching elements 608, 610 to remain in an open state. The example controller 418 determines whether it is time to change energy states (block 914). As in example block 906, the example controller 418 may determine it is time to change energy states based on when the reactive acoustic source 400 is to generate an acoustic wave for measurement and/or logging, based on times to change energy states such as discrete desired times for generating acoustic waves, and/or at times consistent with a control signal such as an M-sequence, a pulse-modulated signal, and/or any other type of periodic or aperiodic signal. If the controller 418 determines it is not time to change energy states (block 914), control returns to block 912 to continue holding the reactive acoustic source in the second energy state.

When the controller 418 determines it is time to change energy states (block 914), the controller 418 closes a second switching element to permit the reactive acoustic source to change to the first energy state (block 916). For example, the controller 418 of FIG. 6 closes the switching element 608 by applying a voltage to the pulse transformer 628 to permit the thyristor 620 to conduct current. As the reactive acoustic source 400 changes to the first energy state, the controller 418 determines whether the example current i through the reactive acoustic source 400 is less than the threshold (block 918). When the current i decreases below the threshold (block 918), the controller 418 determines whether to continue switching the reactive acoustic source 400 between energy states (block 920).

If the example controller 418 is to continue switching the energy states (block 920), control returns to block 904 to hold the reactive acoustic source in the first energy state. On the other hand, if the controller 418 is to stop switching energy states (block 920), the example process 900 of FIG. 9 may end. In some examples, the reactive acoustic source 400 may be permitted and/or forced to discharge any energy stored in the capacitor 404 when the process 900 ends. This may be accomplished by, for example, powering down the excitation sources 604, 606 and closing one or both of the switching elements 608, 610.

Figure 10:
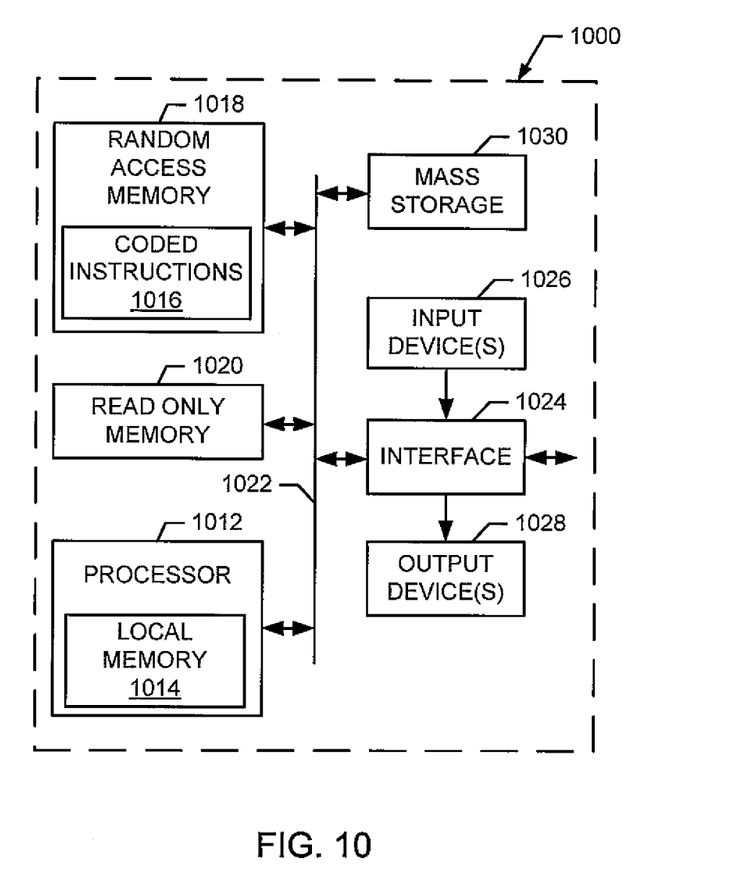
FIG. 10 is a block diagram of an example computer system that may execute example machine readable instructions to implement some or all of the process of FIG. 9 to implement the controller of FIGS. 4-6.

FIG. 10 is a block diagram of an example computer system 1000 that may execute example machine readable instructions to implement some or all of the process of FIG. 10 to implement the driver circuits of FIGS. 4-6. The computer system 1000 can be, for example, a server, a personal computer, a personal digital assistant (PDA), an Internet appliance, a DVD player, a CD player, a digital video recorder, a personal video recorder, a set top box, or any other type of computing device.

The system 1000 of the instant example includes a processor 1012 such as a general purpose programmable processor. The processor 1012 includes a local memory 1014, and executes coded instructions 1016 present in the local memory 1014 and/or in another memory device. The processor 1012 may execute, among other things, machine readable instructions to implement the process represented in FIG. 9. The processor 1012 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1012 is in communication with a main memory including a volatile memory 1018 and a non-volatile memory 1020 via a bus 1022. The volatile memory 1018 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller (not shown).

The system 1000 also includes an interface circuit 1024. The interface circuit 1024 may be implemented by any type of interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, an isopoint and/or a voice recognition system.

One or more output devices 1028 are also connected to the interface circuit 1024. The output devices 1028 can be implemented, for example, by display devices (e.g., a liquid crystal display, a cathode ray tube display (CRT)), by a printer and/or by speakers. The interface circuit 1024, thus, typically includes a graphics driver card.

The interface circuit 1024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The system 1000 also includes one or more mass storage devices 1030 for storing software and data. Examples of such mass storage devices 1030 include floppy disk drives, hard drive disks, compact disk drives and digital versatile disk (DVD) drives.

From the foregoing, systems, methods, and apparatus to drive a reactive acoustic source and/or other reactive loads have been disclosed. Example systems, methods, and apparatus disclosed herein are efficient and relatively simple to implement. Some example systems, methods, and apparatus disclosed herein may be advantageously used to generate acoustic waves for performing monopole and/or multipole acoustic logging, seismic measurements, logging-while-drilling, and/or any other application in which acoustic waves may be used.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
   charging a reactive load;
   selectively holding the reactive load in a first energy state by maintaining a first switching element and a second switching element in an open position, the first energy state comprising a first DC voltage having a first polarity;
   detecting a current in the reactive load with a controller;
   permitting the reactive load to change from the first energy state to a second energy state by switching the first switching element to a closed position and then switching the first switching element to the open position in response to the detected current in the reactive load being substantially zero, the second energy state comprising a second DC voltage having a second polarity opposite the first polarity;
   selectively holding the reactive load in the second energy state by maintaining the first switching element and the second switching element in the open position; and
   permitting the reactive load to change from the second energy state to the first energy state by switching the second switching element to a closed position and then switching the second switching element to the open position in response to the detected current in the reactive load being substantially zero,
   wherein the reactive load generates an acoustic wave during transitions between the first and second energy states.

2. A method as defined in claim 1, wherein holding the reactive load in the first energy state comprises storing the first DC voltage having the first polarity in a reactive component of the reactive load.

3. A method as defined in claim 2, wherein holding the reactive load in the second energy state comprises storing the second DC voltage having the second polarity opposite the first polarity in the reactive component of the reactive load.

4. A method as defined in claim 1, wherein permitting the reactive load to change from the first energy state to the second energy state with the first switching element further comprises causing current to flow through a first closed loop including a first DC voltage source, and wherein permitting the reactive load to change from the second energy state to the first energy state with the second switching element further comprises causing current to flow through a second closed loop including a second DC voltage source.

5. A method as defined in claim 1, wherein the reactive load is held in the first or second energy state, respectively, without a reverse current protection element by opening the first or second switching element, respectively, in response to the detected current through the reactive load being substantially zero.

6. A system comprising:
   a reactive acoustic source to propagate an acoustic wave;
   an excitation source to provide energy to the reactive acoustic source; and
   a driver circuit comprising:
   a first switching element to selectively hold the reactive acoustic source in a first energy state and to selectively allow the reactive acoustic source to change from the first energy state to a second energy state;
   a second switching element to selectively hold the reactive acoustic source in the second energy state and to selectively allow the reactive acoustic source to change from the second energy state to the first energy state; and
   a controller to detect a current in the reactive acoustic source,
   wherein the driver circuit is configured to:
   hold the reactive acoustic source in the first energy state for a first period by maintaining the first switching element and the second switching element in an open position,
   transition the reactive acoustic source from the first energy state to the second energy state by switching the first switching element to a closed position and then switching the first switching element to the open position in response to the detected current in the reactive acoustic source being substantially zero,
   hold the reactive acoustic source in the second energy state for a second period by maintaining the first switching element and the second switching element in the open position, and
   transition the reactive acoustic source from the second energy state to the first energy state by switching the second switching element to a closed position and then switching the second switching element to the open position in response to the detected current in the reactive acoustic source being substantially zero,
   wherein the first energy state comprises a first DC voltage having a first polarity and the second energy state comprises a second DC voltage having a second polarity opposite to the first polarity, and wherein the reactive acoustic source generates an acoustic wave during transitions between the first and second energy states.

7. A system as defined in claim 6, wherein the controller is to control the first and second switching elements based on an M-sequence signal.

8. A system as defined in claim 6, wherein the driver circuit comprises a reactive element in circuit with the reactive acoustic source to provide a countering reactance.

9. A system as defined in claim 6, wherein the reactive acoustic source comprises a piezoelectric transducer.

10. A system as defined in claim 6, further comprising a plurality of receivers to detect the acoustic wave, and a recorder to log times of the detections.

11. A system as defined in claim 6, wherein the excitation source comprises a first DC voltage source and a second DC voltage source, wherein closing the first switching element allows the reactive acoustic source to change from the first energy state to the second energy state by causing current to flow through a first closed loop including the first DC voltage source, and wherein closing the second switching element allows the reactive acoustic source to change from the second energy state to the first energy state by causing current to flow through a second closed loop including the second DC voltage source.

12. A system as defined in claim 6, wherein the reactive acoustic source is held in the first or second energy state, respectively, without a reverse current protection element by opening the first or second switching element, respectively, in response to the detected current through the reactive acoustic source being substantially zero.

* * * * *